(12) United States Patent
Terauchi et al.

(10) Patent No.: US 11,594,775 B2
(45) Date of Patent: Feb. 28, 2023

(54) POWER SUPPLY DEVICE, VEHICLE EQUIPPED WITH POWER SUPPLY DEVICE, AND POWER STORAGE DEVICE

(71) Applicants: Panasonic Corporation, Kadoma (JP); SANYO Electric Co., Ltd., Daito (JP)

(72) Inventors: Shinobu Terauchi, Hyogo (JP); Tetsuji Omura, Hyogo (JP)

(73) Assignees: PANASONIC HOLDINGS CORPORATION, Kadoma (JP); SANYO Electric Co., Ltd., Daito (JP)

( * ) Notice: Subject to any disclaimer, the term of this patent is extended or adjusted under 35 U.S.C. 154(b) by 155 days.

(21) Appl. No.: 16/954,748

(22) PCT Filed: Nov. 26, 2018

(86) PCT No.: PCT/JP2018/043386
§ 371 (c)(1),
(2) Date: Jun. 17, 2020

(87) PCT Pub. No.: WO2019/130937
PCT Pub. Date: Jul. 4, 2019

(65) Prior Publication Data
US 2020/0321575 A1 Oct. 8, 2020

(30) Foreign Application Priority Data
Dec. 25, 2017 (JP) .............................. JP2017-248346

(51) Int. Cl.
*H01M 50/20* (2021.01)
*H01M 50/209* (2021.01)
(Continued)

(52) U.S. Cl.
CPC ......... *H01M 50/20* (2021.01); *H01M 50/209* (2021.01); *H01M 50/224* (2021.01); *H01M 50/249* (2021.01); *H01M 50/264* (2021.01)

(58) Field of Classification Search
None
See application file for complete search history.

(56) References Cited

U.S. PATENT DOCUMENTS

2010/0261088 A1 10/2010 Nishiyama et al.
2011/0151309 A1 6/2011 Park et al.
(Continued)

FOREIGN PATENT DOCUMENTS

JP 2010-251065 A 11/2010
JP 2011-129509 A 6/2011
(Continued)

OTHER PUBLICATIONS

International Search Report dated Jan. 22, 2019, issued in counterpart Application No. PCT/JP2018/043386. (2 pages).
(Continued)

*Primary Examiner* — Carmen V Lyles-Irving
(74) *Attorney, Agent, or Firm* — WHDA, LLP

(57) ABSTRACT

A power supply device disposes an end plate at each end of a battery stack in a stacked direction of the battery stack, and couples a binding bar to the end plate, so as to fix battery cells. The binding bar includes a plate-shaped bar that extends in the stacked direction, and an engagement block that is provided on a plate-shaped bar and protrudes toward an outer peripheral face of the end plate. The engagement block is inserted into a fixing hole provided in the plate-shaped bar and fixed to an inner peripheral face of the fixing hole. The end plate includes a fitting part, to which the engagement block is guided, on the outer peripheral face of the end plate, and includes a stopper that is disposed closer to the battery stack with respect to the fitting part and abuts the engagement block.

16 Claims, 14 Drawing Sheets

(51) Int. Cl.
H01M 50/264 (2021.01)
H01M 50/224 (2021.01)
H01M 50/249 (2021.01)

(56) References Cited

U.S. PATENT DOCUMENTS

| | | |
|---|---|---|
| 2013/0288105 A1 | 10/2013 | Niedzwiecki et al. |
| 2015/0125720 A1 | 5/2015 | Fujii et al. |
| 2015/0243947 A1* | 8/2015 | Seto .................... H01M 50/553 |
| | | 429/158 |
| 2015/0333305 A1 | 11/2015 | Seki et al. |

FOREIGN PATENT DOCUMENTS

| | | | |
|---|---|---|---|
| JP | 2015-518258 | A | 6/2015 |
| JP | 2015-207341 | A | 11/2015 |
| JP | 2015-220117 | A | 12/2015 |
| JP | 2016-46234 | A | 4/2016 |
| JP | 2017-152116 | A | 8/2017 |
| WO | 2014/024433 | A1 | 2/2014 |

OTHER PUBLICATIONS

Extended (Supplementary) European Search Report dated Feb. 24, 2021 issued in counterpart European Patent Application No. 18896665.9. (74 pages).

* cited by examiner

POWER SUPPLY DEVICE, VEHICLE EQUIPPED WITH POWER SUPPLY DEVICE, AND POWER STORAGE DEVICE

TECHNICAL FIELD

The present invention relates to a power supply device, a vehicle equipped with the power supply device, and a power storage device equipped with the power supply device. The power supply device includes a battery stack that has a plurality of battery cells stacked together, and an end plate that holds the battery stack at each end of the battery stack.

BACKGROUND ART

A typical power supply device includes a battery stack formed of a plurality of rectangular battery cells, a pair of end plates, and binding bars. The pair of end plates are disposed at both ends of the battery stack, and the binding bars are configured to couple the pair of end plates together (see PTL 1). In this power supply device, the battery stack formed of the plurality of rectangular battery cells is bound by the end plates and the binding bars, so that the battery stack is assembled.

CITATION LIST

Patent Literature

PTL 1: Unexamined Japanese Patent Publication No. 2015-220117

SUMMARY OF THE INVENTION

Technical Problem

In the power supply device disclosed in PTL 1, the battery stack formed of the plurality of rectangular battery cells is assembled by the end plates and the binding bars, so that the plurality of rectangular battery cells forming the battery stack are less prone to expand. In other words, the expansion of the rectangular battery cells is suppressed by the binding bars and the end plates, resulting in large force applied to the binding bars and the end plates.

On the other hand, when each rectangular battery cell increases energy density per volume or energy density per weight, a dimensional variation of the rectangular battery cell is prone to increase in response to its charging/discharging or degradation. The rectangular battery cell has an amount of expansion that results in a load applied to the binding bars and the end plates. Thus, in the configuration of the power supply device disclosed in PTL 1, when using a rectangular battery cell exhibiting a large dimensional variation in response to the amount of expansion, a large load is applied to the end plates and/or the binding bars, resulting in deformation or damage of the end plates and/or the binding bars.

The present invention has been devised in view of the respects described above, and a main object of the present invention is to provide a technique to prevent the end plates and the binding bars from being deformed or damaged while having the plurality of battery cells assembled together by the end plates and the binding bars.

Solution to Problem

A power supply device according to an aspect of the present invention includes a battery stack having a plurality of battery cells stacked together, a pair of end plates, and binding bars. Each of the pair of end plates is disposed at an end of the battery stack in a stacked direction of the battery stack. Each of the binding bars has its both ends coupled to the pair of end plates. Each of the binding bars includes a plate-shaped bar and engagement blocks. The plate-shaped bar extends in the stacked direction of the battery stack. Each of the engagement blocks is provided on the plate-shaped bar and protrudes toward an outer peripheral face of the corresponding end plate. Each of the engagement blocks is fixed to an inner peripheral face of a fixing hole provided in the plate-shaped bar in a state where the corresponding engagement block is inserted into the fix hole. Each of the end plates includes fitting parts and stoppers. Each of the fitting parts is disposed on the outer peripheral face of the end plate and configured to guide the corresponding engagement block. Each of the stoppers is disposed closer to the battery stack with respect to the fitting part and is configured to abut the corresponding engagement block. In the power supply device, the engagement blocks are respectively guided to the fitting parts and then are fixed to the outer peripheral faces of the end plate.

A power supply device according to another aspect of the present invention includes a battery stack having a plurality of battery cells stacked together, a pair of end plates, and binding bars. Each of the pair of end plates is disposed at an end of the battery stack in a stacked direction of the battery stack. Each of the binding bars has its both ends coupled to the pair of end plates. Each of the binding bars includes a plate-shaped bar and engagement blocks. The plate-shaped bar extends in the stacked direction of the battery stack, and each of the engagement blocks is provided on the plate-shaped bar and protrudes toward an outer peripheral face of the corresponding end plate. The plate-shaped bar and the engagement blocks are made of a same metal material and integrally formed. Each of the end plates includes fitting parts and stoppers. Each of the fitting parts is disposed on the outer peripheral face of the end plate and configured to guide the corresponding engagement block. Each of the stoppers is disposed closer to the battery stack with respect to the fitting part and configured to abut the corresponding engagement block. In the power supply device, the engagement blocks are respectively guided to the fitting parts and then are fixed to the outer peripheral faces of the end plate.

Further, an electric vehicle equipped with the power supply device (including configuration elements according to the aspect above) includes: the power supply device; a motor for driving, the motor to which the power supply device supplies power; a vehicle body on which the power supply device and the motor are mounted; and wheels configured to be operated by the motor to drive the vehicle body.

Further, a power storage device equipped with the power supply device (including the configuration elements according to the aspect above) includes the power supply device, and a power supply controller configured to control charging to and discharging from the power supply device. The power supply controller is configured to allow the battery cells to be charged by power from an externally connected device and is configured to control charging to the battery cells.

Advantageous Effect of Invention

The present invention provides a power supply device that has a simple configuration but prevents an end plate and/or a binding bar from being deformed or damaged even when a relatively large load is applied to the end plate and/or the binding bar. The reason is that the power supply device has the configurations below: the binding bar includes a plate-shaped bar, and an engagement block that protrudes toward an outer peripheral face of the end plate; the binding bar has the engagement block inserted into a fixing hole provided in the plate-shaped bar and fixed therein, or alternatively, the binding bar has the engagement block and the plate-shaped bar made of a same metal material and integrally formed; the end plate includes a fitting part on the outer peripheral face of the end plate, the fitting part configured to guide the engagement block, and includes a stopper disposed closer to a battery stack with respect to the fitting part and configured to abut the engagement block; and when the engagement block has been guided to the fitting part, the engagement block is held in this state and fixed to the outer peripheral face of the end plate.

Further in the power supply device described above, the engagement block is guided to the fitting part of the end plate to be fixed to the end plate. This configuration increases coupling strength between the end plate and the binding bar, and concurrently, the engagement block prevents the end plate from moving out of position.

DESCRIPTION OF EMBODIMENT

Figure 1:
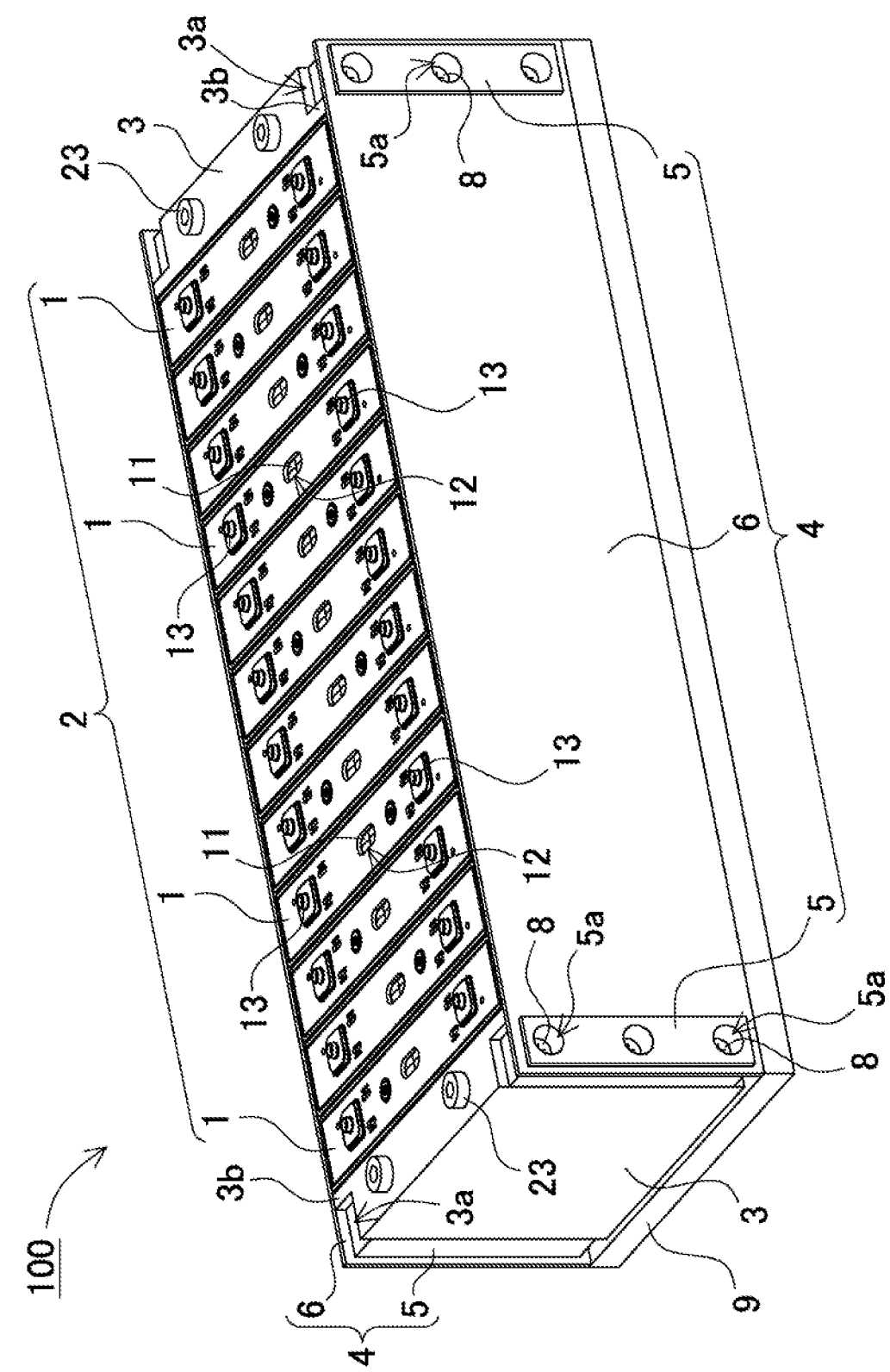
FIG. 1 is a perspective view of a power supply device according to an exemplary embodiment of the present invention.

First, a focus point of the present invention will be described. A power supply device having a plurality of battery cells stacked together includes a battery stack formed of the plurality of battery cells, end plates, and binding bars. Each of the end plates is disposed at an end of the battery stack, and each of the binding bars is configured to couple the end plates together, so that the plurality cells are bound. The plurality of battery cells are bound together with the end plates and the binding bars, both having high rigidity. With this configuration, the battery cells are less prone to have a fault in response to the charging/discharging or degradation, the fault such as an expansion, a deformation, a relative movement, or oscillation. As a result, malfunctions caused by the battery cells are less prone to occur. In the power supply device described above, each of the battery cells has a stacked surface with an area of approximately 100 square centimeters. In the configuration where the expansion of the battery cells is suppressed, strong force more than 1 ton may be applied to the end plates. The end plates are fixed to the binding bars, and thus, considerably strong tensile fore is applied through the end plates to the binding bars.

In a conventional power supply device having the ends of the battery stack fixed by the end plates, each of the binding bars has its both ends bent inward at 90 degrees to form bent regions, and has each of the bent regions fixed to an outer side face of the corresponding end plate. In this configuration, the ends of the binding bar as a metal sheet are bent to form the bent regions, and each of the bent regions is fixed to the outer face of the corresponding end plate. Thus, each of the bent regions is formed of a metal sheet having a same thickness as that of the binding bar. The binding bar employs a metal sheet that exhibits tensile strength to endure the tensile force generated by the expansion force of the battery cells. A metal sheet has tensile strength considerably greater than strength against bending stress. The binding bar employs, for example, a metal sheet having a thickness of approximately 1 mm to 2 mm. The binding bar has each of the bent regions fixed to the outer face of the corresponding end plate. Here, in reaction to the tensile force applied to the binding bar, the bending stress is applied to the bent regions. A metal sheet used as the end plate has the strength against bending stress considerably smaller than the tensile strength. The bending stress affects the bent regions, causing a bending part of each of the bent regions to go beyond its endurance or breaking strength limit and result in deformation or breakage. Here, without having any clearance between the bending part of the bent region and the end plate, an inner side face of the bending part is brought into contact with a corner of the end plate without clearance, thereby hindering assembly.

As has been described above, when the tensile force applied to the binding bar is increased, great local stress is further concentrated on an area between an inner side of the bending part of the binding bar and the corner of end plate, resulting in deformation or damage of the binding bar and/or the end plate. In view of the respects described above, it is important to optimize the binding bar and the end plate and to study a configuration to keep the stress applied to each of the binding bar and the end plate within the endurance limit.

A power supply device according to an aspect of the present invention may be specified in a configuration below. The power supply device includes battery stack 2 having a plurality of battery cells 1 stacked together, a pair of end plates 3, and binding bars 4. Each of the pair of end plates 3 is disposed at an end of battery stack 2 in a stacked direction of the battery stack 2. Each of binding bars 4 has its both ends coupled to the pair of end plates 3. Each binding bar 4 includes plate-shaped bar 6 and engagement blocks 5. Plate-shaped bar 6 extends in the stacked direction of battery stack 2, and each engagement block 5 is provided on plate-shaped bar 6 and protrudes toward an outer peripheral face of end plate 3. Each engagement block 5 is fixed to an inner peripheral face of fixing hole 6a in plate-shaped bar 6 in a state where corresponding engagement block 5 is inserted into fixing hole 6a. Each end plate 3 includes fitting parts 3a and stoppers 3b. Each fitting part 3a is disposed on the outer peripheral face of end plate 3 and configured to guide engagement block 5. Each stopper 3b is disposed closer to battery stack 2 with respect to fitting part 3a and configured to abut engagement block 5. In the power supply device, engagement blocks 5 are respectively guided to fitting parts 3a and then are fixed to the outer peripheral faces of end plate 3.

Further, a power supply device according to another aspect of the present invention may be specified in a configuration below. The power supply device includes battery stack 2 having a plurality of battery cells 1 stacked together, a pair of end plates 3, and binding bars 4. Each of the pair of end plates 3 is disposed at an end of battery stack 2 in a stacked direction of battery stack 2. Each of binding bars 4 has its both ends coupled to the pair of end plates 3. Each binding bar 4 includes plate-shaped bar 6 and engagement blocks 5. Plate-shaped bar 6 extends in the stacked direction of battery stack 2, and each engagement block 5 is provided on plate-shaped bar 6 and protrudes toward an outer peripheral face of end plate 3. Plate-shaped bar 6 and engagement block 5 are made of a same metal material and integrally formed. Each end plate 3 includes fitting parts 3a and stoppers 3b. Each fitting part 3a is disposed on the outer peripheral face of end plate 3 and configured to guide engagement block 5. Each stopper 3b is disposed closer to battery stack 2 with respect to fitting part 3a and configured to abut engagement block 5. In the power supply device, engagement blocks 5 are respectively guided to fitting parts 3a and then are fixed to the outer peripheral faces of end plate 3.

In the power supply device described above, each of the engagement blocks is guided to the corresponding fitting part, and the corresponding stopper prevents the engagement block from moving out of position. Further, each of the engagement blocks is fixed to the corresponding end plate. Accordingly, by means of the engagement block and the stopper, the binding bar is coupled to the end plate without getting deformed, unlike a conventional binding bar where the bent region is deformed by the bending stress. More specifically, the engagement block is guided to the fitting part of the end plate, and the stopper of the end plate prevents the engagement block from moving out of position. Accordingly, the binding bar and the end plate are less prone to be deformed by strong tensile force applied to the binding bar, and the end plate is less prone to move from its position.

Figure 14:
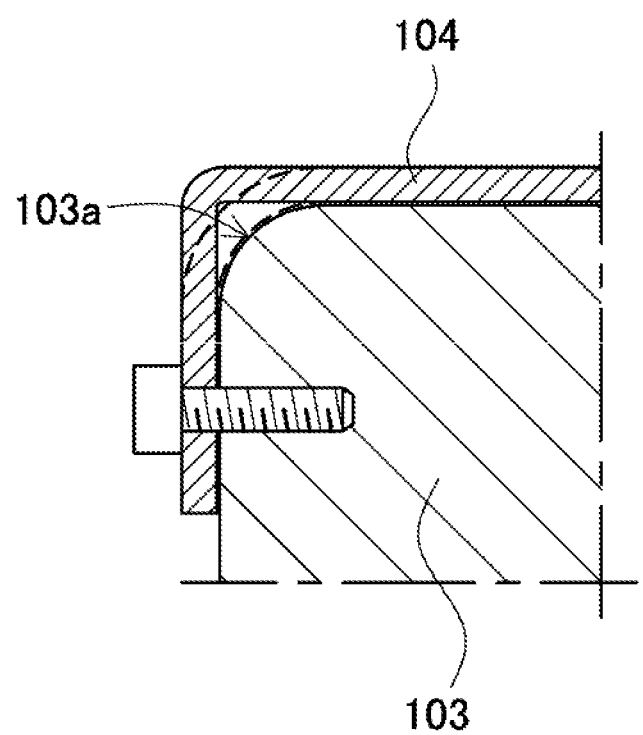
FIG. 14 is an enlarged sectional view of a bending part of a binding bar included in a conventional power supply device.

In reaction to expansion force of the battery cells, the strong tensile force is applied to the binding bar. With a conventional power supply device, the tensile force applied to the binding bar affects the bending part as bending stress, causing the binding bar to be deformed. When the binding bar is deformed as a result of the bending stress, as illustrated in FIG. 14, an inner side face of the bending part is brought into contact with corner 103a of end plate 103 without clearance, so that binding bar 104 has a substantially extended shape. In this state, the binding bar may be broken beyond its material endurance and strength limit.

In view of such a problem, with the power supply device described above, each of the engagement blocks of the binding bar is guided to the corresponding fitting part of the end plate, and the stopper prevents the engagement block guided to here from moving out of position. With this configuration, even when having a clearance between the engagement block and the end plate, the binding bar fixed to the end plate is not required to resist the bending stress applied to the bent region (that is, a conventional configuration). In the configuration where the engagement block is guided to the fitting part and disposed in a fixed position by the stopper, the binding bar resists shear stress. The binding bar exhibits strength against the shear stress considerably greater than strength against the tensile force. Accordingly the binding bar is not deformed by the strong tensile force applied, and prevents the end plates from moving off.

Each engagement block 5 is fixed to the outer peripheral face of end plate 3 with a plurality of bolts 8. Engagement block 5 includes guiding recess 5a to prevent head part 8a of each bolt 8 from protruding from a face of engagement block 5. Having head part 8a guided into guiding recess 5a, bolt 8 penetrates engagement block 5 to screw into end plate 3.

Plate-shaped bar 6 and engagement block 5 may be made of any one of iron, an iron alloy, stainless steel (SUS), aluminum, and an aluminum alloy. Engagement block 5 has a width in the stacked direction of the battery cells, and the width may be set to be more than or equal to 10 mm. End plate 3 may be made of metal.

Further, an electric vehicle equipped with the power supply device (including configuration elements according to the aspects above) includes: power supply device 100, motor 93, vehicle body 90, and wheels 97. Power supply device 100 is configured to supply power to motor 93; each of power supply device 100 and motor 93 is mounted on vehicle body 90; and wheels 97 are configured to be operated by motor 93 to drive vehicle body 90.

Further, a power storage device equipped with the power supply device (including the configuration elements according to the aspects above) includes: power supply device 100, and power supply controller 84 configured to control charging to and discharging from power supply device 100. Power supply controller 84 is configured to allow battery cells 1 to be charged by power from an externally connected device and is configured to control charging to battery cells 1.

An exemplary embodiment of the present invention will be described below with reference to the drawings. It is to be understood that the exemplary embodiment below is merely for purpose of embodying a technical concept of the present invention and does not limit the present invention accordingly. Further, in this description, members indicated in the claims are in no way limited to members described in the exemplary embodiment. More specifically, in absence of specific description, a feature of each component described in the exemplary embodiment, such as a dimension, a material, a shape, or a relative position, is simply for purpose of illustrative example and is in no way intended to limit the scope of the present invention. It should be noted that a size, spatial relation, or the like of each of the members illustrated in the drawings may be exaggerated for purpose of clear description. In descriptions below, same names and reference signs represent identical or equivalent members, and a detailed description thereof will be omitted as appropriate. Further, with regard to each constituent element of the present invention, a plurality of constituent elements may be a same member, in other words, a single member may serve as the plurality of constituent elements. Alternatively, functions of a single member may be divided among a plurality of members. Additionally, part of contents described in the exemplary embodiment and an example may be applied in other exemplary embodiments and examples.

First Exemplary Embodiment

Figure 2:
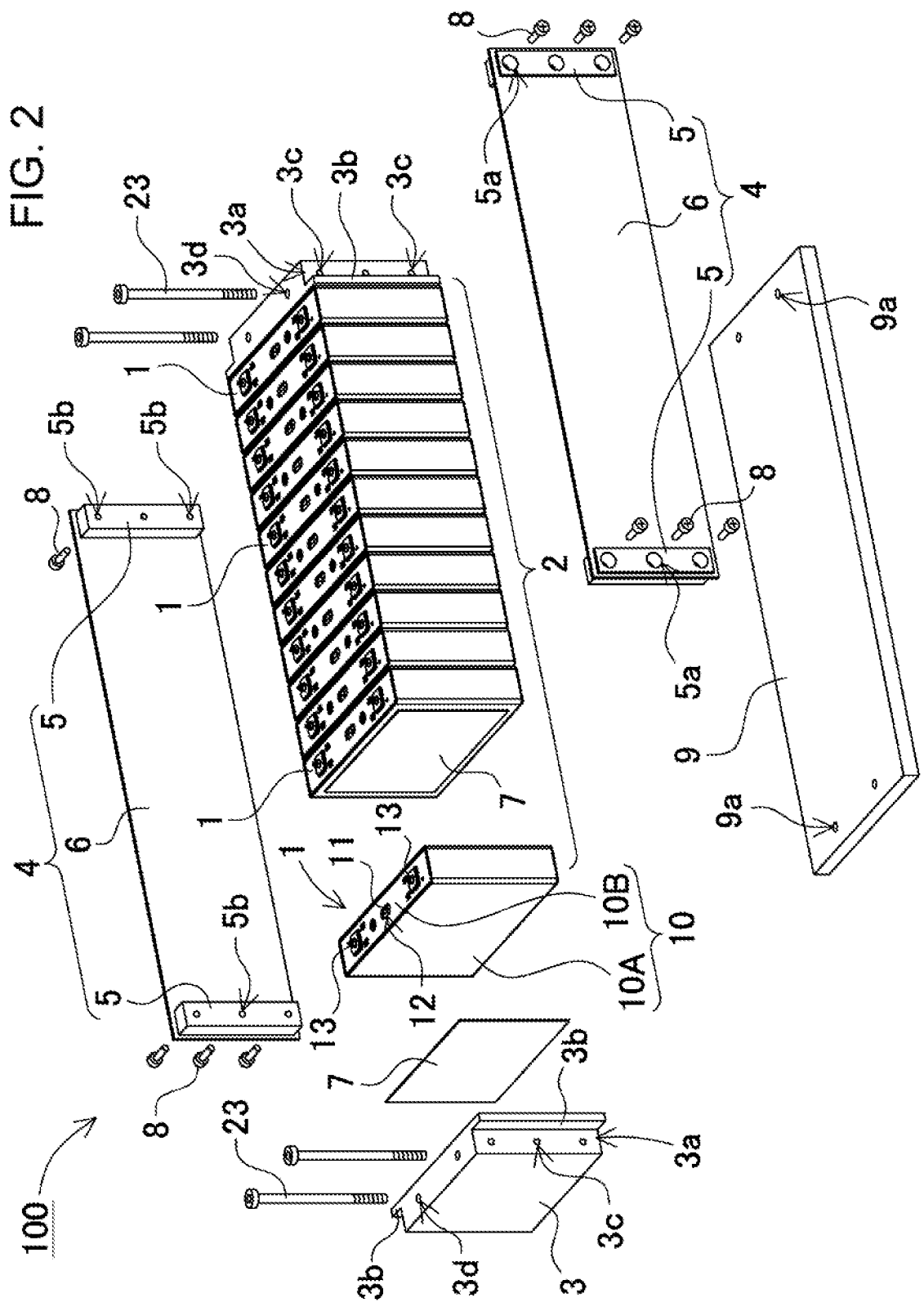
FIG. 2 is an exploded perspective view of the power supply device illustrated in FIG. 1.
Figure 3:
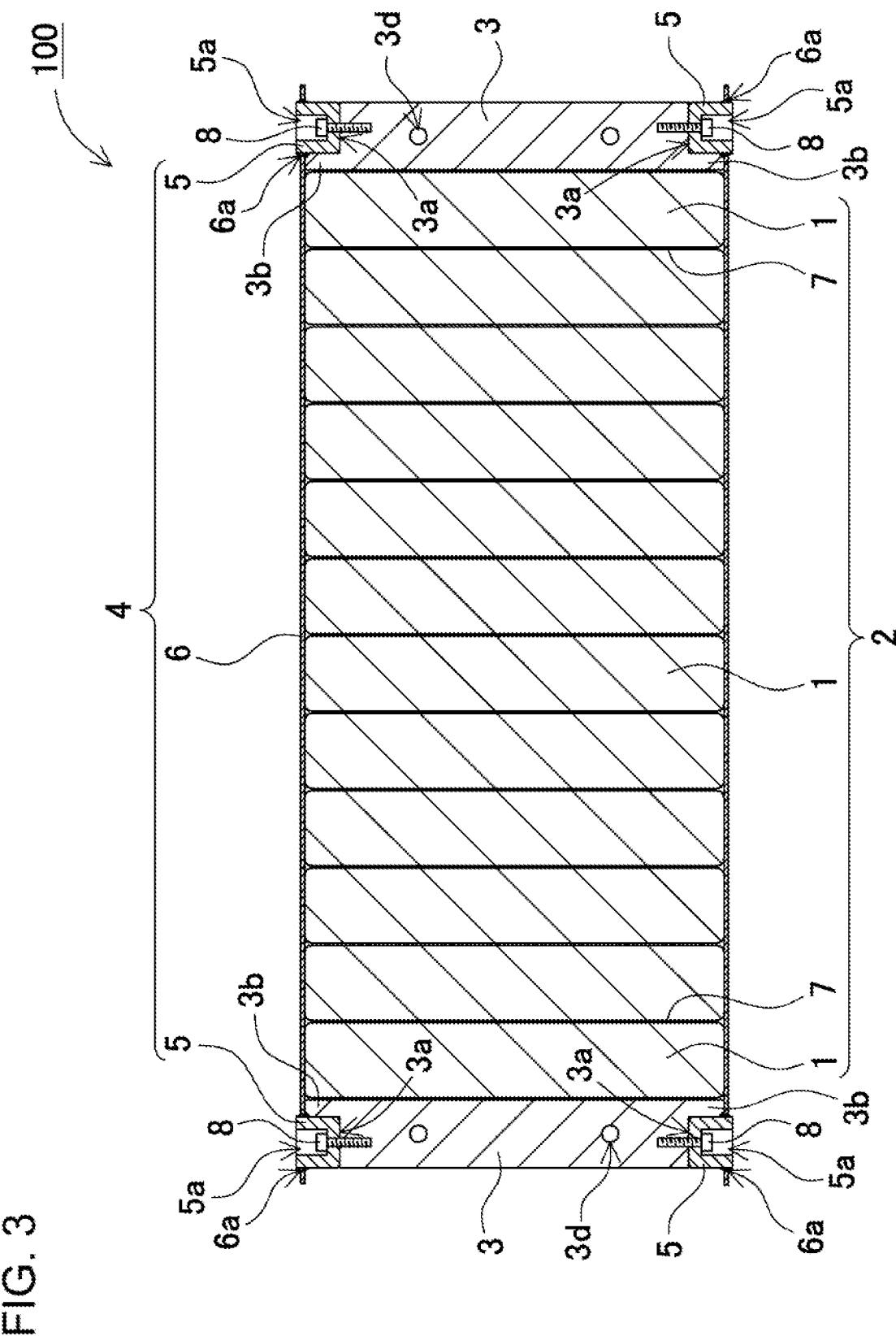
FIG. 3 is a horizontal sectional view of the power supply device illustrated in FIG. 1.

Power supply device 100 illustrated in FIGS. 1 to 3 includes battery stack 2 having a plurality of battery cells 1 stacked together, a pair of end plates 3, and binding bars 4. Each of the pair of end plates 3 is disposed at an end of battery stack 2 in a stacked direction of the battery stack 2. Each of binding bars 4 has its both ends coupled to the pair of end plates 3 such that the plurality of battery cells 1 are held in the stacked direction.

(Battery Cell 1)

As illustrated in FIG. 2, each battery cell 1 is a rectangular box-shaped battery and is greater in width than in thickness. In other words, battery cell 1 is thinner than its width and is stacked in the thickness direction to form battery stack 2. Battery cell 1 is a nonaqueous electrolyte battery in battery case 10 made of metal. Battery cell 1 as the nonaqueous electrolyte battery is a lithium ion secondary battery. Note that, other secondary batteries, such as a nickel hydride battery or a nickel cadmium battery, may be employed for a battery cell. Battery cell 1 here is a rectangular-shaped battery, having two large-width surfaces. Each battery cell 1 is stacked such that the two large-width surfaces oppose each other, and battery stack 2 is formed.

Battery cell 1 includes battery case 10 that is made of metal and formed in a rectangular box shape. Battery case 10 accommodates an electrode assembly (not illustrated) and is filled with electrolyte solution. Battery case 10 as a metal case may be manufactured from aluminum or an aluminum alloy. Battery case 10 includes exterior can 10A and sealing plate 10B. Exterior can 10A is formed of a metal sheet pressed into a bottom-end cylindrical shape, and sealing plate 10B air-tightly seals an opening of exterior can 10A. Sealing plate 10B is a planar metal sheet, and has an outer shape identical to a shape of the opening of exterior can 10A. Sealing plate 10B is laser-welded to be fixed to an outer peripheral edge of exterior can 10A, so as to air-tightly seal the opening of exterior can 10A. Sealing plate 10B fixed to exterior can 10A has, at its both ends, electrode terminals 13 (positive and negative) fixed. Sealing plate 10B also has gas exhaust port 12 provided at a center between electrode terminals 13 (positive and negative). At an inner side of gas exhaust port 12, exhaust valve 11 is provided and configured to open at predetermined internal pressure. Battery stack 2 in FIG. 2 has the plurality of battery cells 1 stacked in an orientation where each face provided with exhaust valve 11 is positioned in a substantially same plane. In each battery cell 1, exhaust valve 11 is arranged in the same plane. Battery stack 2 here has the plurality of battery cells 1 stacked in an orientation where each sealing plate 10B provided with exhaust valve 11 is positioned as an upper face.

The plurality of battery cells 1 stacked to each other are connected in series and/or in parallel via electrode terminals 13 (positive and negative). Power supply device 100 connects electrode terminals 13 (positive and negative) of each adjacent two of battery cells 1 in series and/or in parallel via bus bars (not illustrated). A power supply device connects each adjacent two of the battery cells in series in order to increase an output voltage and thus increase the output. The power supply device connects the adjacent two of the battery cells in parallel in order to increase charging/discharging current.

(Battery Stack 2)

In FIGS. 2 and 3, battery stack 2 has the plurality of battery cells 1 stacked with spacer 7 interposed between battery cells 1, and has battery cells 1 connected in series. Battery stack 2 here has each adjacent two of battery cells 1 arranged in an opposite direction, and has electrode terminals 13 at each side of the adjacent two of battery cells 1 connected via the bus bars. With this configuration, each adjacent two of battery cells 1 are connected in series, so that all of battery cells 1 are connected in series. However, a number and the connected state of the battery cells in the battery stack does not limit the present invention.

As illustrated in FIGS. 2 and 3, battery stack 2 has spacer 7 sandwiched between battery cells 1 stacked. Spacer 7 insulates battery cells 1 adjacent to each other. Spacer 7 here is an insulating plate of plastic formed in a plate shape. Specifically, spacer 7 is formed of a plastic material having a low thermal conductivity, and effectively prevents thermal runaway of battery cells 1 adjacent to spacer 7. Spacer 7 has a shape, to which each battery cell 1 is fitted to be arranged in a fixed position. Thus, battery cells 1 adjacent to each spacer 7 are stacked without being out of position.

As has been described above, each of battery cells 1, stacked and insulated by spacer 7, may have an exterior can made of metal such as aluminum. However, the battery stack is not necessarily required to have a spacer between the battery cells. For example, the exterior can of the battery cell may be formed of an insulating material. Alternatively, an outer periphery of the exterior can of the battery cell may be coated with an insulating sheet, insulating paint, or the like. In these methods, the battery cells adjacent to each other are insulated, and the spacer is thus not required. Further, with the battery stack having no spacer interposed between the battery cells, it is possible to employ a system to cool the battery cells directly by using refrigerant or the like, instead of employing an air-cooling system to cool the battery cells by forcibly flowing cooling air between the battery cells.

(End Plate 3)

End plates 3 are respectively coupled to binding bars 4 and sandwich battery stack 2 at both end faces of battery stack 2, so that battery cells 1 are fixed in the stacked direction. Each end plate 3 has an outer shape approximately equivalent to or slightly larger than an outer shape of battery cell 1. End plate 3 is a rectangular-shaped plate material, and has an outer peripheral face of its each end fixed to each of binding bars 4, so as to suppress expansion of battery stack 2. End plate 3 is overall made of metal such as aluminum, an aluminum alloy, stainless steel (BUS), or iron. While not illustrated, an end plate may be a metal sheet laminated on plastics. Alternatively, the end plate may be a fiber-reinforced resin molded plate in which reinforcing fibers are overall embedded.

Each end plate 3 is in surface contact with battery cell 1 directly or with a spacer interposed between end plate 3 and battery cell 1 in order to hold battery cells 1. In a process of assembling power supply device 100, end plates 3 are disposed at both ends of battery stack 2. Subsequently, end plates 3 are pressed by a press machine (not illustrated) at the both ends of battery stack 2 such that battery cells 1 are pressed to be held in the stacked direction. In this state, binding bars 4 are fixed to end plates 3. When end plates 3 have been fixed to binding bars 4, the press machine stops pressing end plates 3.

End plates 3 are fixed to binding bars 4 to absorb expansion force of battery stack 2 and hold battery cells 1. Each end plate 3 includes, on the outer peripheral faces of its both ends, fitting parts 3a. Each binding bar 4, to which end plate 3 is to be fixed, includes engagement blocks 5. Fitting parts 3a are respectively configured to guide engagement blocks 5 of binding bar 4 such that end plate 3 is reliably coupled to binding bar 4. Further, each end plate 3 includes stoppers 3b provided closer to battery stack 2 with respect to fitting parts 3a. Stoppers 3b abut engagement blocks 5. In other words, each end plate 3 includes stoppers 3b close to battery stack 2, and fitting parts 3a on side faces of corresponding end plate 3. Each stopper 3b is configured to prevent engagement block 5 from moving out of position in response to tensile force applied to binding bar 4, and is configured to dispose engagement block 5 in a fixed position. Each stopper 3b has a width sufficient not to be deformed by the tensile force that is applied to binding bar 4 and affects engagement block 5. Width (h2) of stopper 3b is set to be an optimal value in view of the tensile force applied to binding bar 4. For example, when end plate 3 is overall made of aluminum, width (h2) of stopper 3b is more than or equal to 3 mm, preferably more than or equal to 4 mm, more preferably more than or equal to 5 mm, and optimally more than or equal to 8 mm.

Figure 4:
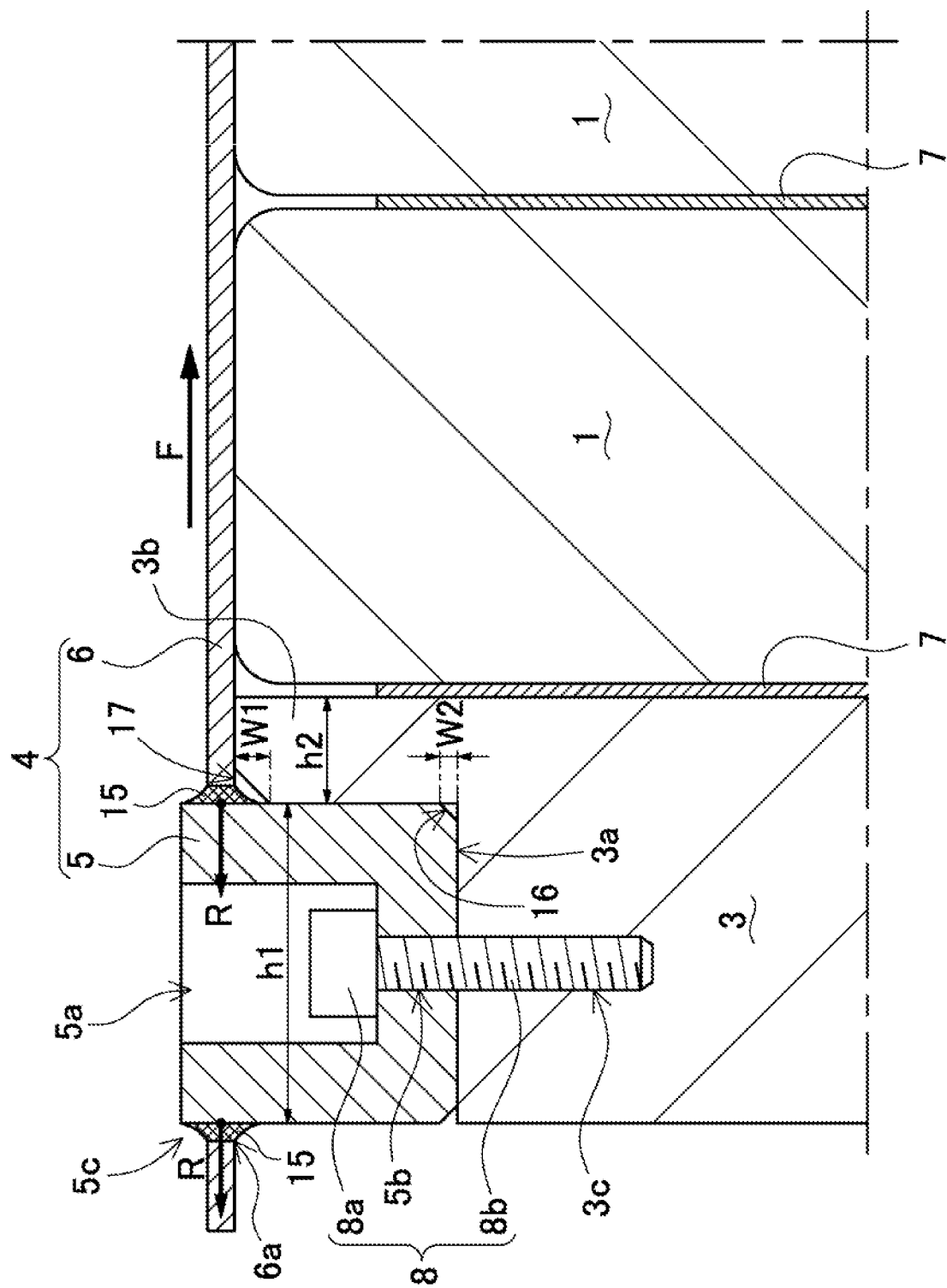
FIG. 4 is an enlarged sectional view of main part of the power supply device illustrated in FIG. 3.

FIG. 4 is a schematic enlarged sectional view of an area where engagement block 5 is guided to fitting part 3a. End plate 3 here has clearance 16 at a corner between fitting part 3a and stopper 3b.

With clearance 16 provided here, end plate 3 has width (h2) of stopper 3b far greater than width (W2) of clearance 16, for example, greater than 10 times width (W2). Stopper 3b, having width (h2) far greater than width (W2) of clearance 16, resists tensile force F applied to binding bar 4 as shear stress. Maximum shear force that materials endure is considerably stronger than maximum bending force, and width (h2) of stopper 3b is designed to be greater than width (W2) of clearance 16. This configuration reliably prevents stopper 3b from being deformed. In other words, with clearance 16 provided at the corner between fitting part 3a and stopper 3b, end plate 3 has width (h2) of stopper 3b greater than 10 times width (W2) of clearance 16, so as to resist tensile force F applied to binding bar 4 as the shear stress onto stopper 3b and prevent stopper 3b from being deformed.

(Binding bar 4)

Each binding bar 4 includes plate-shaped bar 6 and engagement blocks 5. Plate-shaped bar 6 extends in the stacked direction of battery stack 2, and engagement blocks 5 are provided at both ends of plate-shaped bar 6. In binding bar 4 here, each engagement block 5 is provided at one of both ends of plate-shaped bar 6 and protrudes toward an outer peripheral face of corresponding end plate 3. Plate-shaped bar 6 is disposed at each side of battery stack 2, and each engagement block 5 is fixed to the outer peripheral face of corresponding end plate 3.

Plate-shaped bar 6 is a metal sheet configured to endure strong tensile force. Plate-shaped bar 6 is, for example, a metal sheet such as a high tensile steel sheet exhibiting strength against tensile force of more than or equal to 400 MPa. Plate-shaped bar 6 as the high tensile steel sheet has a thickness of, for example, 1 mm to 2 mm and exhibits strength against the tensile force applied to binding bar 4. In FIG. 2, each binding bar 4 employs, as plate-shaped bar 6 disposed at each side of battery stack 2, a metal sheet having its upper edge (along a width of the metal sheet) disposed above battery stack 2 and its lower edge (along the width) disposed below battery stack 2. In power supply device 100 here, plate-shaped bar 6 as a single metal sheet is disposed at each side face of battery stack 2. Alternatively, while not illustrated, the power supply device may have a plate-shaped bar formed of two metal sheets (divided into upper and lower parts) disposed at each side face of the battery stack.

Each binding bar 4 in FIGS. 1 to 3 has engagement blocks 5 fixed to both ends of plate-shaped bar 6. Binding bar 4 here has fixing hole 6a at each end of plate-shaped bar 6. Binding bar 4 has each engagement block 5 inserted into fixing hole 6a to be welded to an inner peripheral face of fixing hole 6a. As a result, engagement block 5 is fixed to plate-shaped bar 6. Fixing hole 6a is pierced through plate-shaped bar 6. As illustrated in an enlarged sectional view of FIG. 4 and an enlarged perspective view of FIG. 5, binding bar 4 has fixing hole 6a provided in plate-shaped bar 6. Fixing hole 6a has an inner shape slightly greater than an outer shape of engagement block 5. Binding bar 4 has engagement block 5 inserted into fixing hole 6a, and has an inner peripheral edge of fixing hole 6a and an outer peripheral face of engagement block 5 welded to each other. In this state, engagement block 5 is fixed to plate-shaped bar 6. Engagement block 5 in the perspective view of FIG. 4 is inserted into fixing hole 6a to slightly protrude from a face of plate-shaped bar 6. Then, filler material 15 is provided between the outer peripheral face of protruded part 5c of engagement block 5 and plate-shaped bar 6. Engagement block 5 is welded around its entire perimeter to be fixed to fixing hole 6a. With this configuration, engagement block 5 is reliably fixed to plate-shaped bar 6 with high weld strength. Having engagement block 5 welded to be fixed into fixing hole 6a of plate-shaped bar 6, binding bar 4 has engagement block 5 and plate-shaped bar 6 integrally formed in a fitted configuration and a welded configuration. This configuration causes no reduction in strength of an area where fixing hole 6a is provided. As illustrated in FIG. 4, having engagement block 5 welded to be fixed into fixing hole 6a, reaction force R is generated in reaction to tensile force F applied to plate-shaped bar 6. In this state, the tensile force is applied to one side face of engagement block 5 and compressive force is applied to the other side face of engagement block 5.

Figure 6:
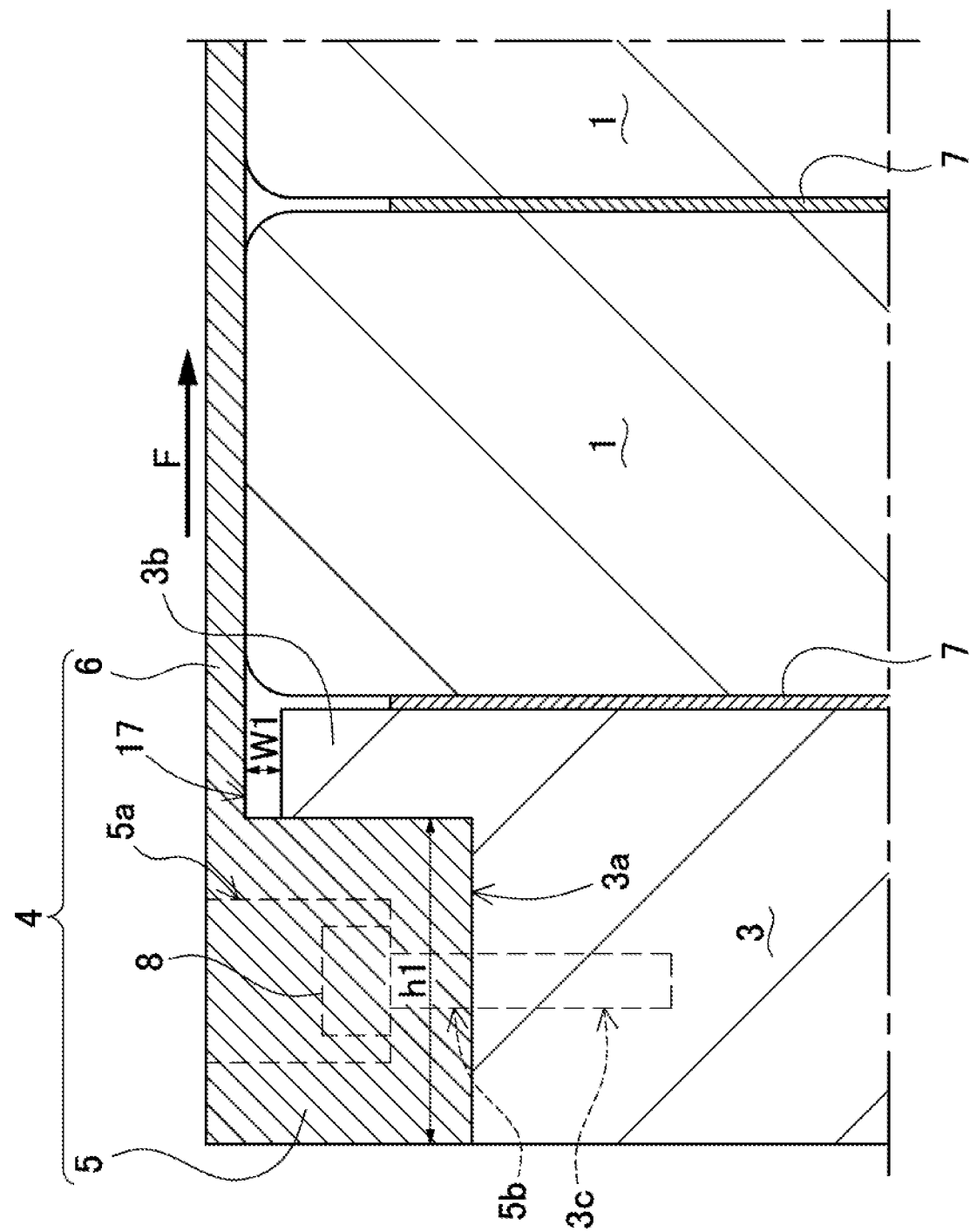
FIG. 6 is an enlarged sectional view of main part of one of other examples of a binding bar.

In FIG. 6, binding bar 4 has engagement block 5 and plate-shaped bar 6 made of a same material and integrally formed such that engagement block 5 is provided at each end of plate-shaped bar 6. Binding bar 4 here has engagement block 5 made of metal extruded and formed to be provided at each end of plate-shaped bar 6. Alternatively, binding bar 4 has engagement block 5 made of metal forged to be provided at each end of plate-shaped bar 6. Binding bar 4 here has engagement block 5 manufactured as integrally formed with plate-shaped bar 6. Thus, engagement block 5 here has an increased coupling strength, compared with binding bar 4 where engagement block 5 is welded to be fixed to plate-shaped bar 6.

Engagement block 5 is fixed to each end plate 3 with bolts 8, so that binding bar 4 couples the pair of end plates 3. Each bolt 8 penetrates engagement block 5 to screw into end plate 3. In this state, engagement block 5 is fixed to end plate 3. In this fixed configuration of power supply device 100, engagement block 5 is reliably fixed to end plate 3, and concurrently, each of bolt 8 and stopper 3b reliably prevents engagement block 5 from moving out of position. The reason is that bolt 8 presses engagement block 5 with respect to fitting part 3a and fix engagement block 5 in the position, and that stopper 3b reliably prevents engagement block 5 from moving out of the position. Further, bolt 8 has axial force to prevent engagement block 5 from moving out of the position.

Figure 5:
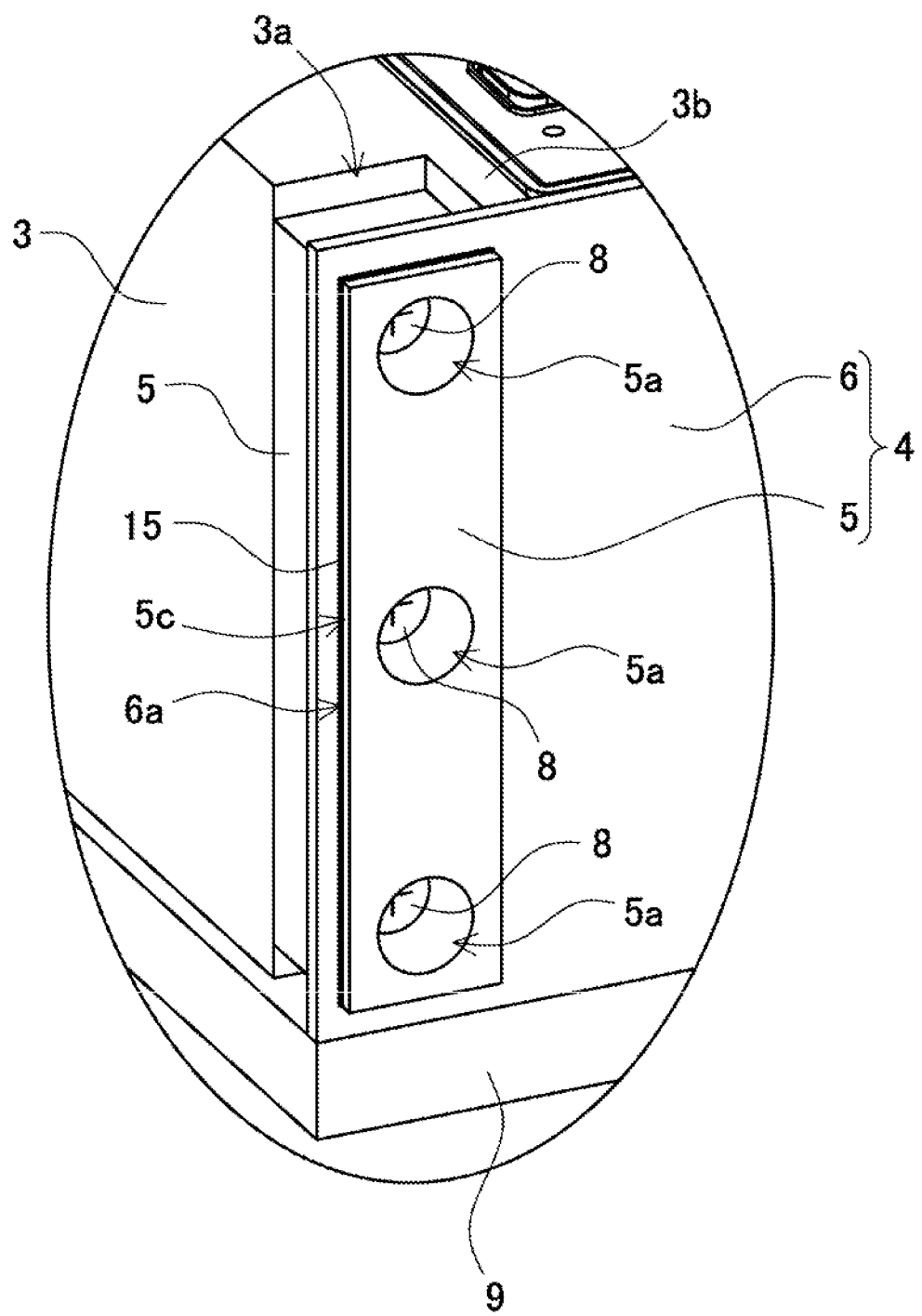
FIG. 5 is an enlarged perspective view of an engagement block of the power supply device illustrated in FIG. 1.
Figure 7:
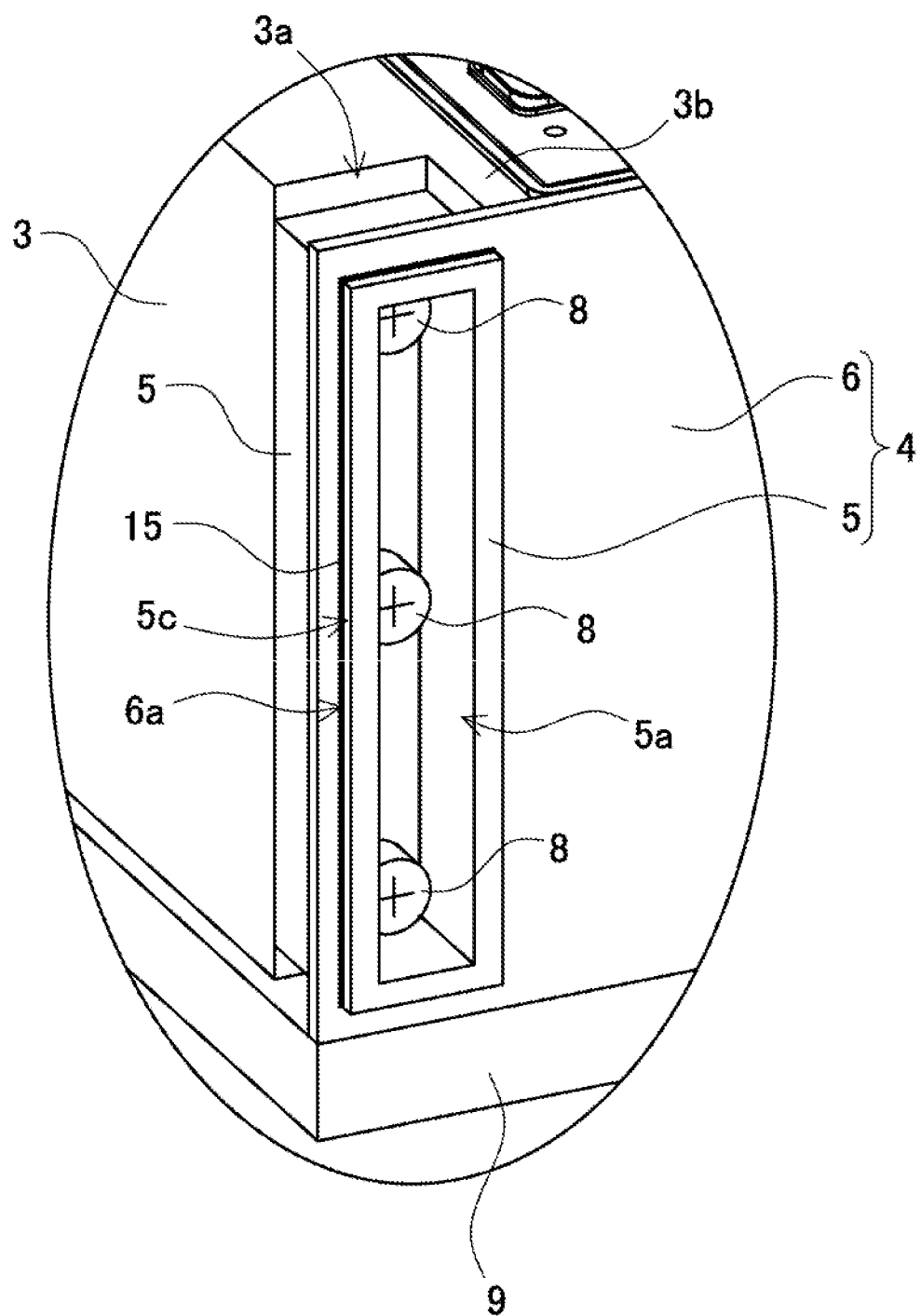
FIG. 7 is an enlarged perspective view of one of other examples of a guiding recess provided in the engagement block.

Engagement block 5 includes guiding recess 5a to guide head part 8a of bolt 8 in order to prevent bolt 8 from protruding from the face of engagement block 5. Guiding recess 5a has a depth sufficient to prevent head part 8a of bolt 8 from protruding from the face of engagement block 5. Alternatively, head part 8a of bolt 8 may be configured to slightly protrude from the face. Guiding recess 5a has, at its bottom, through-hole 5b through which threaded part 8b of bolt 8 is inserted. Engagement block 5 here guides head part 8a of bolt 8 into guiding recess 5a, and has threaded part 8b inserted into through-hole 5b and then screwed into female screw hole 3c of end plate 3. In this state, engagement block 5 is fixed to end plate 3. In FIG. 5, engagement block 5 includes a plurality of guiding recesses 5a in areas where bolts 8 are to be fixed. Engagement block 5 guides each bolt 8 into guiding recess 5a in order to be fixed to end plate 3. Engagement block 5 here includes guiding recesses 5a in parts thereof, so that overall strength of engagement block 5 is increased. In FIG. 7, engagement block 5 includes guiding recess 5a of a groove shape extending longitudinally. Guiding recess 5a includes a plurality of through-holes 5b that are spaced at a predetermined distance from each other. Engagement block 5 here has threaded part 8b inserted into through-hole 5b in order to be fixed to end plate 3.

With engagement block 5 having guiding recess 5a of the groove shape, it is possible to achieve weight reduction.

In the stacked direction of battery cells, engagement block 5 has width (h1) set to be a width sufficient not to be deformed by tensile force F applied to plate-shaped bar 6. Width (h) is set to be, for example, more than or equal to 10 mm. FIGS. 4 and 6 each illustrate a coupled configuration where clearance 17 is formed at an inner side of a corner of engagement block 5. Here, having width (h1) of engagement block 5 set to be far greater than dimension (W) of clearance 17 at the inner side of the corner of engagement block 5, for example, greater than 10 times dimension (W) of clearance 17, engagement block 5 resists tensile force F applied to binding bar 4 as the shear stress. For example, when dimension (W) of clearance 17 is 1 mm, width (h) of engagement block 5 is set to be 10 mm. With this configuration, engagement block 5 has width (h1) greater than approximately 10 mm to resist tensile force F applied to plate-shaped bar 6 as the shear stress. Accordingly, having width (h1) greater than or equal to 10 mm, engagement block 5 resists tensile force F applied to plate-shaped bar 6 as the shear stress and achieve sufficient strength.

Figure 8:
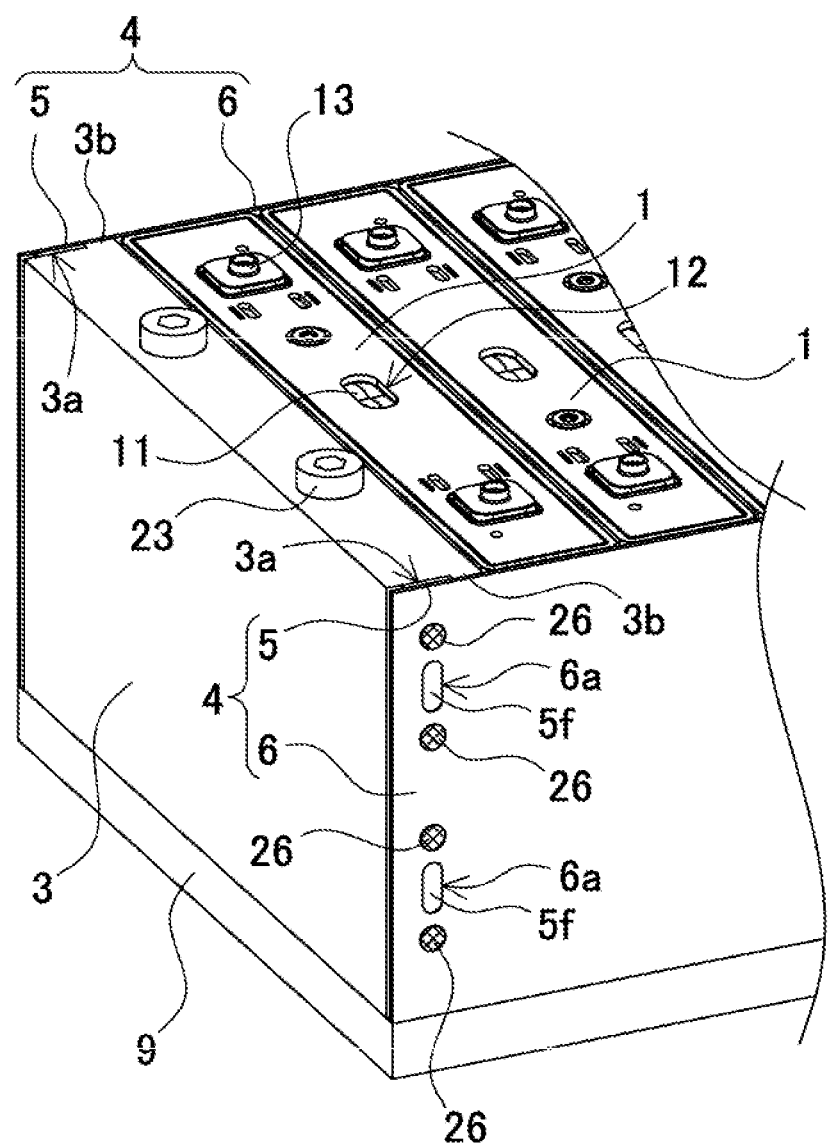
FIG. 8 is a perspective view of one of other examples of the end plate and the binding bar.
Figure 9:
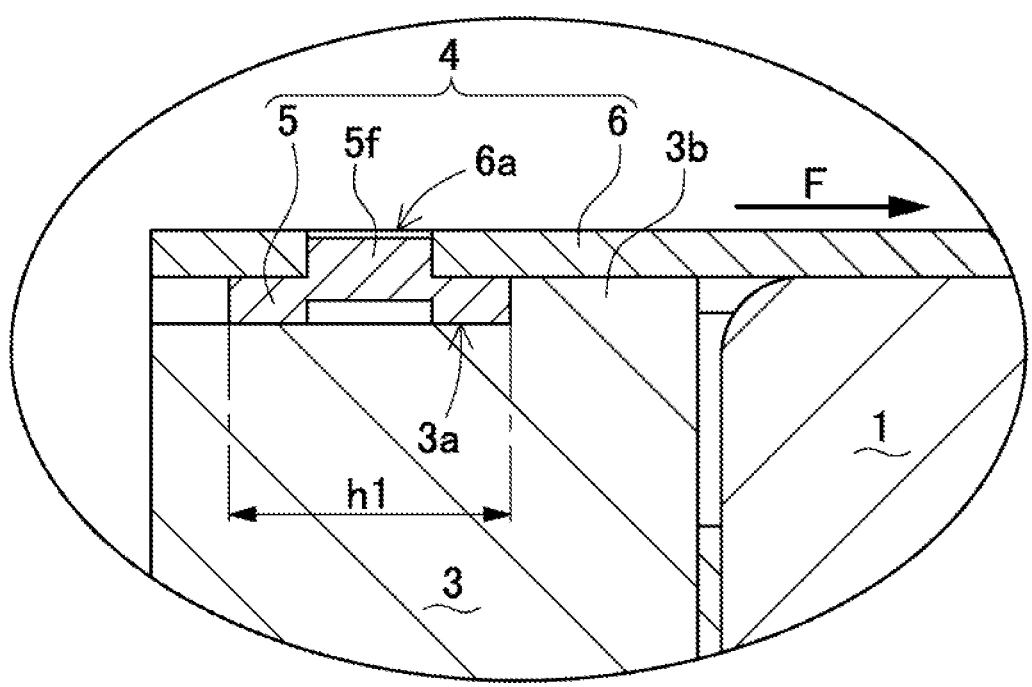
FIG. 9 is an enlarged sectional view of the end plate and the binding bar illustrated in FIG. 8.

Further, binding bar 4 may have a configuration illustrated in FIGS. 8 and 9. Binding bar 4 here has fixing holes 6a at each end of plate-shaped bar 6, and a part of engagement block 5 is to be inserted into each of fixing holes 6a. Thus, engagement block 5 is fixed to plate-shaped bar 6 in the fitted configuration. Plate-shaped bar 6 has, at its each end disposed opposite corresponding fitting part 3a of end plate 3, two fixing holes 6a that are pierced through plate-shaped bar 6 at upper side and lower side and are spaced from each other. FIG. 8 illustrates fixing holes 6a, each having an oval shape and extending top to bottom.

As illustrated in FIG. 9, engagement block 5 is disposed at a region at the inner side of plate-shaped bar 6, the region including fixing hole 6a. Concurrently, engagement block 5 includes fitted protrusion 5f at an area opposing fixing hole 6a. Fitted protrusion 5f protrudes outward (in a thickness direction of engagement block 5). Fitted protrusion 5f has an outer shape to follow an inner shape of fixing hole 6a. Fitted protrusion 5f is shaped to follow fixing hole 6a as a through-hole, for example, in the following steps: in a state where engagement block 5 is disposed on the inner side face of plate-shaped bar 6 with fixing hole 6a pierced through plate-shaped bar 6, the region of engagement block 5 opposing fixing hole 6a is pressed (e.g., punch-pressed) from the inner side such that a part of engagement block 5 is protruded outward. Engagement block 5 has fitted protrusion 5f formed by punch-pressing, and then has fitted protrusion 5f press-fitted into fixing hole 6a without clearance. As a result, engagement block 5 is coupled to plate-shaped bar 6 in the fitted configuration. Alternatively, engagement block 5 may have fitted protrusion 5f previously formed in a predetermined shape, and then has fitted protrusion 5f inserted into fixing hole 6a. In this state too, engagement block 5 is coupled to plate-shaped bar 6 in the fitted configuration. Further, engagement block 5 may have fitted protrusion 5f formed by cutting or casting, instead of pressing.

Further, binding bar 4 in FIG. 8 has each engagement block 5 spot welded to plate-shaped bar 6, below and above each area where engagement block 5 is coupled to plate-shaped bar 6 in the fitted configuration, in other words, below and above each fixing hole 6a. In FIG. 8, weld marks 26 caused by this spot welding are illustrated by cross-hatching. As has been described above, engagement block 5 is fixed to plate-shaped bar 6 in concurrent use of the fitted configuration and the welded configuration, so that engagement block 5 is further firmly fixed to plate-shaped bar 6. Binding bar 4 here also has width (h1) of engagement block 5 set to be greater than or equal to 10 mm. Accordingly, as has been previously described, binding bar 4 resists tensile force F applied to plate-shaped bar 6 as the shear stress and achieve sufficient strength. Alternatively, while not illustrated, binding bar 4 here may have each of the engagement blocks fixed to the end plate with bolts (penetrating the corresponding engagement block) as with the binding bar previously described. Still alternatively binding bar 4 here may have each of the engagement blocks fixed to the end plate with bolts that penetrate both the corresponding engagement block and the plate-shaped bar.

Figure 10:
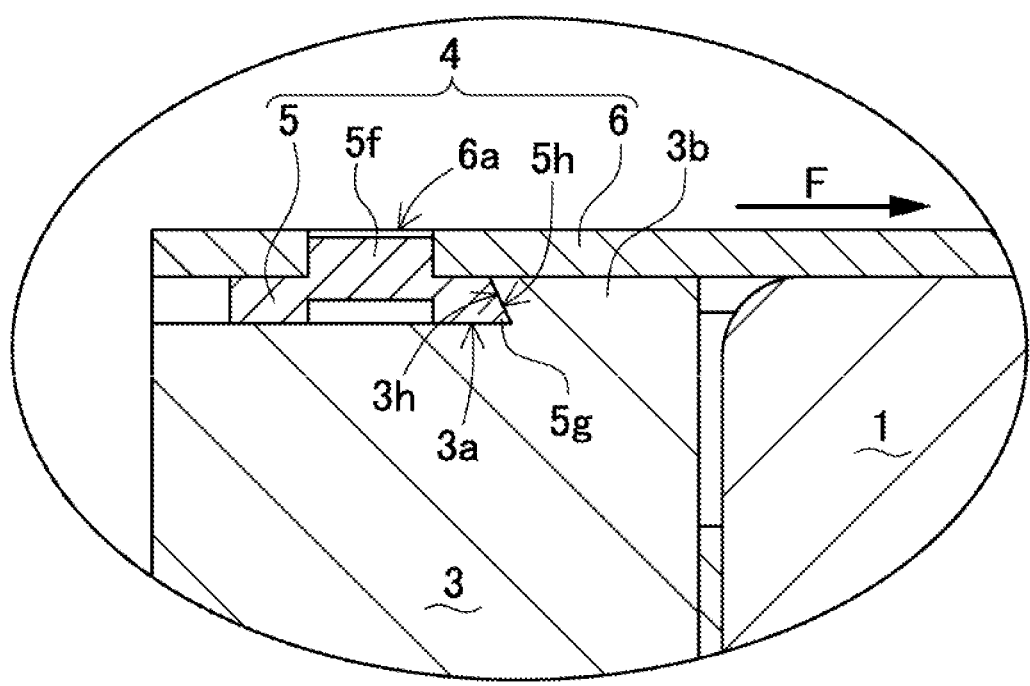
FIG. 10 is an enlarged sectional view of one of other examples of the end plate and the binding bar.

Further, as illustrated in FIG. 10, engagement block 5 of binding bar 4 and stopper 3b of end plate 3 may be coupled to each other in an engaged configuration. In end plate 3 in FIG. 10, stopper 3b includes, at its tip end, cut face 3h of an undercut shape as a face opposing engagement block 5. Engagement block 5 includes, at a side closer to battery stack 2, engaged protrusion 5g, which is to be fitted into the corner between fitting part 3a and stopper 3b. Engaged protrusion 5g has engaged face 5h as a face opposing stopper 3b. Engaged face 5h is disposed along cut face 3h. This engaged configuration effectively prevents binding bar 4 from moving out of position toward the side face of battery stack 2, and increases the coupling strength between engagement block 5 (fixed to each end of binding bar 4) and stopper 3b to ensure stable fastening. Alternatively, the engaged configuration between binding bar 4 and end plate 3 may be a fitted configuration, such as follows: a configuration where any one of the face of engagement block 5 and the face of stopper 3b, each face opposing the other, has a protrusion, the other of the faces has a recess, and then, the protrusion is fitted into the recess; or, a configuration where any one of the faces has a ridge extending top to bottom, the other of the faces has a recess or a groove extending top to bottom, and then the ridge is fitted into the recess or the groove.

With regard to binding bar 4 in FIG. 10, in the process of assembling the power supply device, end plates 3 are disposed and pressed by the press machine (not illustrated) at both ends of battery stack 2 such that battery cells 1 are pressed to be held in the stacked direction. In this state, each engaged protrusion 5g is guided into fitting part 3a of end plate 3. When each binding bar 4 has had engagement blocks 5 at its both ends engaged to the pair of end plates 3, the press machine stops pressing, and battery stack 2 is held pressed at predetermined pressure. Note that, by sliding binding bar 4 top to bottom with respect to battery stack 2 that is being pressed by the press machine, it is possible to carry out this coupling without over pressing battery cells 1. Alternatively, battery stack 2 may be somewhat over pressed in the stacked direction, and a dimension of end plate 3 at each end of battery stack 2 may be reduced by a protruded amount of engaged protrusion 5g. In this state too, engaged protrusion 5g is guided into fitting part 3a, and when the press machine has stopped pressing, binding bars 4 hold battery stack 2 pressed at predetermined pressure. Note that, the binding bar may alternatively have only one end coupled to the end plate in the engaged configuration described above, and may have the other end fixed to the end plate with bolts.

Power supply device 100 in FIGS. 1 and 2 includes base plate 9 on which battery stack 2 is mounted. Base plate 9 has end plates 3 fixed thereto. In order to be fixed to base plate 9, each end plate 3 has, at its both sides, through-holes 3d, each extending in a direction parallel to battery cells 1 and extending top to bottom in FIGS. 1 and 2. Fixing screw 23 is inserted into each of through-holes 3d. Fixing screw 23 has its tip end fixed to base plate 9, so that end plate 3 is fixed to base plate 9. Fixing screw 23 is screwed into each of female screw holes 9a in the base plate 9 to be fixed to base plate 9, or is screwed into a nut on a bottom face of the base plate to be fixed to the base plate. Alternatively, the binding bar may include a fastened part as a part to be fastened to the base plate.

Figure 11:
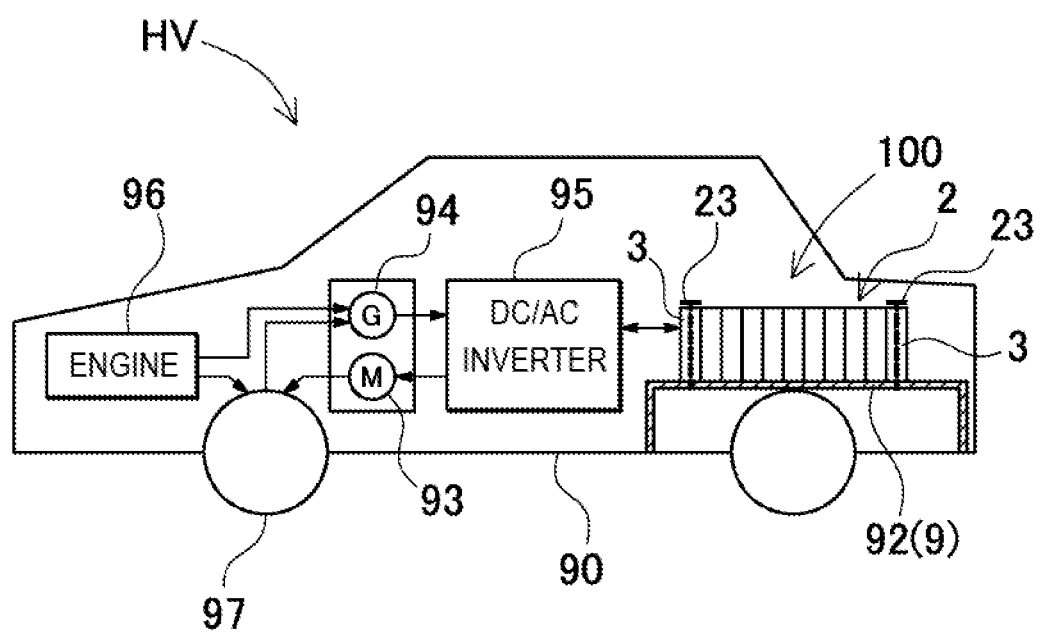
FIG. 11 is a block diagram of an example of a hybrid vehicle equipped with the power supply device, the hybrid vehicle running on both an engine and a motor.
Figure 12:
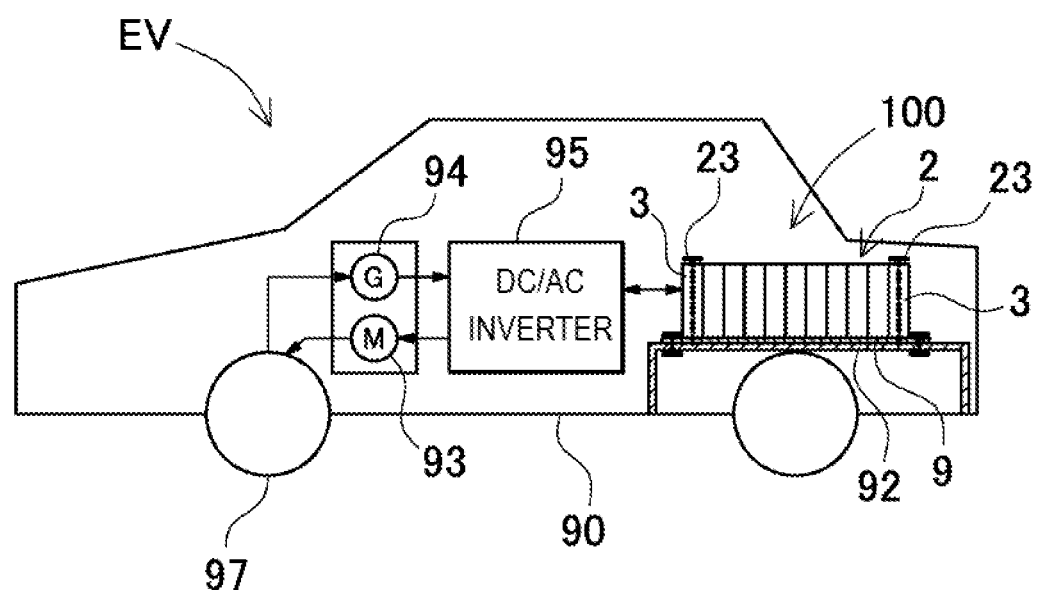
FIG. 12 is a block diagram of an example of an electric vehicle equipped with the power supply device, the electric vehicle running on the motor only.

As illustrated in FIG. 11, power supply device 100 is mounted to a vehicle to supply power to motor 93 for driving the vehicle and has base plate 9 as chassis 92 of the vehicle. When power supply device 100 has been placed on chassis 92 of the vehicle, power supply device 100 has fixing screw 23 inserted into through-hole 3d of end plate 3, and then has fixing screw 23 screwed into a female screw hole (not illustrated) of chassis 92. As a result, power supply device 100 is fixed to chassis 92 of the vehicle. Here, power supply device 100 has base plate 9 as chassis 92 of the vehicle, but the base plate is not necessarily specified as a chassis of a vehicle. For example, as illustrated in FIG. 12, base plate 9 may be a metal sheet, and power supply device 100 may be fixed on base plate 9 as the metal sheet. Then, base plate 9 is fixed to chassis 92 of the vehicle, so that power supply device 100 is mounted to the vehicle.

Power supply device 100 in the foregoing description is assembled in a process as follows:

(1) A predetermined number of battery cells 1 are stacked in the thickness direction of battery cells 1 with spacers 7 each interposed between battery cells 1, and as a result, battery stack 2 is formed.

(2) The pair of end plates 3 are disposed at both ends of battery stack 2. Then, end plates 3 are pressed by a press machine (not illustrated) at both ends of battery stack 2 such that end plates 3 press battery stack 2 at predetermined pressure and hold battery cells 1 in a pressed state.

(3) In the state where the pair of end plates 3 press battery stack 2, each binding bar 4 is coupled and fixed to end plates 3. Binding bar 4 is disposed such that engagement blocks 5 at both ends of binding bar 4 are respectively guided to fitting parts 3a of the pair of end plates 3. Concurrently, bolts 8 penetrating engagement blocks 5 are screwed into female screw holes 3c of end plates 3. As a result, binding bar 4 is fixed to end plates 3. When each binding bar 4 has been fixed to the pair of end plates 3, pressing stops.

(4) At both sides of battery stack 2, electrode terminals 13 of each adjacent two of battery cells 1 oppose each other and are connected via bus bars (not illustrated). The bus bars are fixed to electrode terminals 13 to connect battery cells 1 in series, or both in series and in parallel. The bus bars are welded to electrode terminals 13 or screwed in to be fixed to electrode terminals 13.

(5) Battery stack 2 is disposed on an upper face of base plate 9 to be fixed to base plate 9.

The power supply device in the foregoing description is optimally used as a power supply device for a vehicle. The power supply device is configured to supply power to a motor for driving an electric vehicle. The electric vehicle equipped with the power supply device includes an electric vehicle running on a motor only, a plug-in hybrid vehicle or a hybrid vehicle running on both an engine and a motor. These electric vehicles use the power supply device as a power source.

(Power Supply Device for Hybrid Vehicle)

FIG. 11 illustrates an example of a hybrid vehicle equipped with the power supply device, the hybrid vehicle running on both an engine and a motor. Vehicle HV equipped with the power supply device in FIG. 16 includes vehicle body 90, engine 96, motor 93, power supply device 100, generator 94, and wheels 97. Engine 96 and motor 93 are configured to drive vehicle body 90; power supply device 100 is configured to supply power to motor 93; generator 94 is configured to charge batteries for power supply device 100; and wheels 97 are configured to be operated by motor 93 and engine 96 to drive vehicle body 90. Power supply device 100 is connected to motor 93 and generator 94 via DC/AC inverter 95. Vehicle HV runs on both motor 93 and engine 96 while charging and discharging the batteries for power supply device 100. In operational modes where engine efficiency is poor, for example, during acceleration or low speed cruise, motor 93 is operated to drive the vehicle. Motor 93 is operated on power supplied from power supply device 100. Generator 94 is operated by engine 96 or by regenerative braking when the vehicle brake pedal is pressed, and charges the batteries for power supply device 100.

(Power Supply Device for Electric Vehicle)

Further, FIG. 12 illustrates an example of an electric vehicle equipped with the power supply device, the electric vehicle running on a motor only. Vehicle EV equipped with the power supply device in FIG. 17 includes vehicle body 90, motor 93, power supply device 100, generator 94, and wheels 97. Motor 93 is configured to drive vehicle body 90; power supply device 100 is configured to supply power to motor 93; generator 94 is configured to charge batteries for power supply device 100; and wheels 97 are configured to be operated by motor 93 to drive vehicle body 90. Motor 93 is operated on power supplied from power supply device 100. Generator 94 is operated by energy from regenerative braking of vehicle EV, and charges the batteries for power supply device 100.

(Power Supply Device for Power Storage Device)

Figure 13:
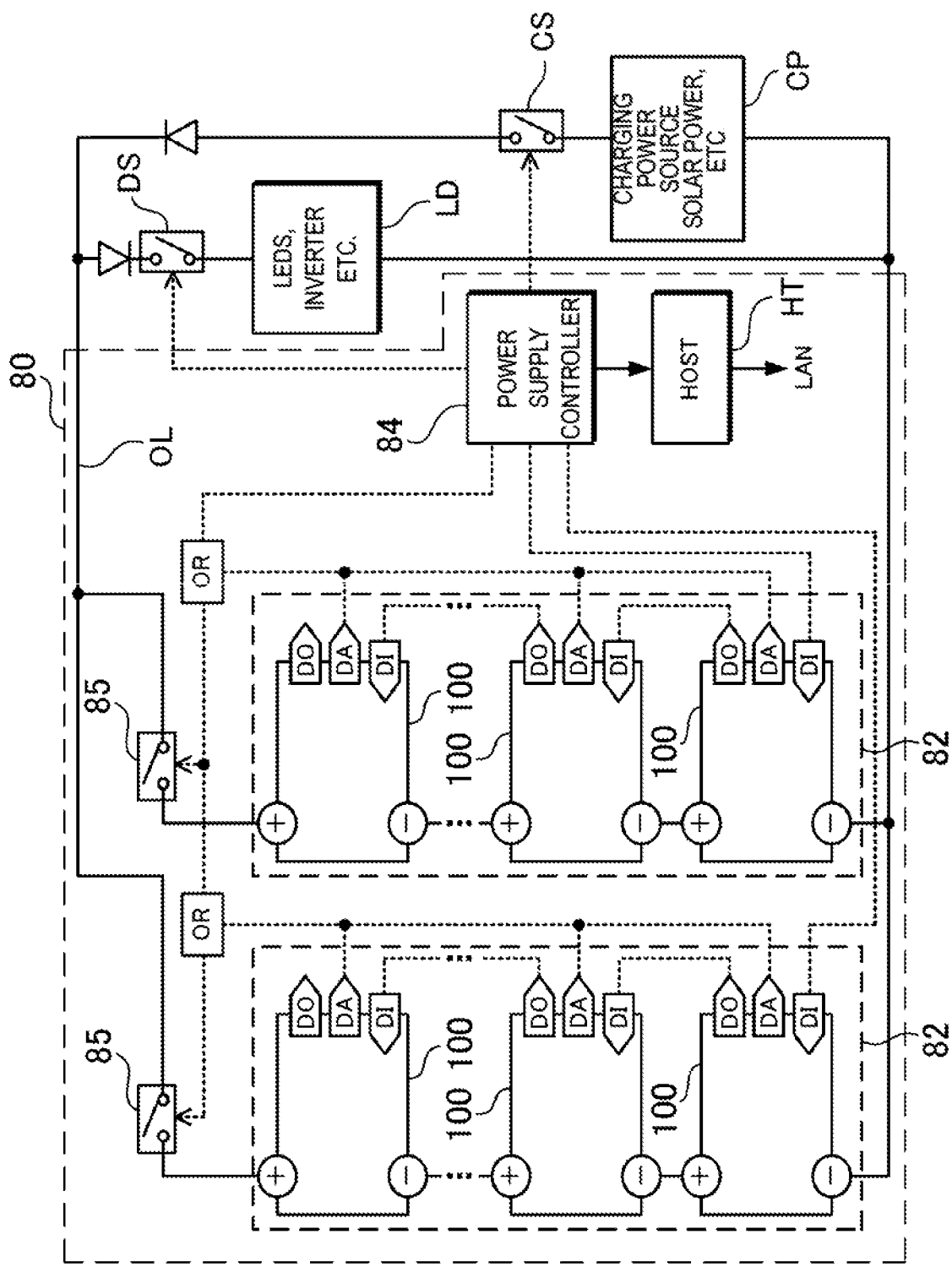
FIG. 13 is a block diagram of an example of a power storage device equipped with the power supply device.

Further, with regard to an application of a power supply device, the present invention is not limited to a power supply device mounted to an electric vehicle. Accordingly, a power supply device according to the present invention may be applied to store large power, for example, as a power supply device mounted to a power storage device for storing natural energy such as solar power or wind power, or as a power supply device mounted to a power storage device for storing late-night power. For example, the power supply device is applicable as a power supply system in private homes or manufacturing facilities, and the power supply system is charged by solar power, late-night power, or the like and is discharged when required. Alternatively, the power supply device is applicable as a streetlight power source charged by solar power during daylight and discharged at night, or as a backup power source for operating traffic signals during power failure. FIG. 13 shows an example of such power supply devices. Note that, as an exemplary power storage device, FIG. 13 shows power storage device 80 with a large capacity and high power. In order to gain desired power, power storage device 80 includes a plurality of the power supply devices described above and connected in series or in parallel, along with required controlling circuits.

Power storage device 80 in FIG. 13 has a plurality of power supply devices 100 connected in units to form each power supply unit 82. Each power supply device 100 has a plurality of battery cells connected in series and/or parallel. Each power supply device 100 is controlled by power supply controller 84. Power storage device 80 charges power supply unit 82 with charging power source CP, and then operates load LD.

Accordingly, power storage device 80 includes a charging mode and a discharging mode. Load LD and charging power source CP are each connected to power storage device 80 via discharging switch DS and charging switch CS. Discharging switch DS and charging switch CS are each controlled to be ON and OFF by power supply controller 84 in power storage device 80. In the charging mode, power supply controller 84 switches charging switch CS "ON" and discharging switch DS "OFF", so as to allow power storage device 80 to be charged from charging power source CP. When power storage device 80 has been fully charged or charged to a capacity more than or equal to a predetermined value, power supply controller 84 switches charging switch CS "OFF" and discharging switch DS "ON" in response to demand from load LD, so as to allow discharge from power storage device 80 to load LD. Further, as required, charging switch CS and discharging switch DS may be both turned ON, so as to allow power to be supplied to load LD and concurrently to allow power storage device 80 to be charged.

Power storage device 80 operates load LD that is connected to power storage device 80 via discharging switch DS. In the discharging mode of power storage device 80, power supply controller 84 switches discharging switch DS "ON" to have load LD connected to power storage device 80, so that load LD is operated with power from power storage device 80. Discharging switch DS may be a switching device such as a field effect transistor (FET). Discharging switch DS is controlled to be ON and OFF by power supply controller 84 in power storage device 80. Additionally, power supply controller 84 includes a communication interface to communicate with an externally connected device.

In the example of FIG. 13, power supply controller 84 is connected to host device HT via known protocols such as universal asynchronous receiver transmitter (UART) and recommended standard-232 (RS-232C). Further, as required, a user interface may be provided to allow a user to directly operate the power supply system.

Each power supply device 100 includes a signal terminal and a power source terminal. The signal terminal includes input/output terminal DI, abnormality output terminal DA, and connecting terminal DO. Input/output terminal DI allows output and input of signals to and from power supply controller 84 or other power supply devices 100. Connecting terminal DO allows output and input of signals to and from other power supply devices 100. Abnormality output terminal DA serves to output abnormalities of power supply device 100 to external devices. The power source terminal allows each power supply device 100 to be connected to the other in series or parallel. Each power supply unit 82 is connected to output line OL via parallel connecting switch 85 to further be connected to the other power supply unit 82 in parallel.

INDUSTRIAL APPLICABILITY

The present invention provides a power supply device, a vehicle equipped with the power supply device, and a power storage device equipped with the power supply device; the power supply device according to the present invention is preferably applicable as a power supply device for a vehicle such as a plug-in hybrid electric vehicle and a hybrid electric vehicle (HEV) mode that switch between an electric vehicle (EV) mode, a hybrid electric vehicle, or an electric vehicle. Further, the power supply device is appropriately applicable as: a backup power supply device mountable to a computer server rack; a backup power supply device for a wireless base station for, for example, cellular phones; a power supply device for a power storage device combined with solar cells, such as a power source for storing power in private homes or manufacturing facilities, or a streetlight power source; or a backup power source for traffic signals.

The invention claimed is:

1. A power supply device comprising:
    a battery stack configured to have a plurality of battery cells stacked together;
    a pair of end plates disposed at both ends of the battery stack in a stacked direction of the battery stack; and
    a binding bar configured to have both ends of the binding bar coupled to the pair of end plates, wherein
    the binding bar includes: a plate-shaped bar that extends in the stacked direction of the battery stack; and an engagement block that is provided on the plate-shaped bar and protrudes toward an outer peripheral face of each of the pair of end plates,
    the engagement block is fixed to an inner peripheral face of a fixing hole provided in the plate-shaped bar in a state where the engagement block is inserted into the fixing hole,
    one of the pair of end plates includes: a fitting part to which the engagement block is guided, on the outer peripheral face of the one of the pair of end plates; a stopper that is disposed at a side of the battery stack with respect to the fitting part and abuts the engagement block; and a clearance at a corner between the fitting part and the stopper, and
    the engagement block is guided to the fitting part and is fixed to the outer peripheral face of the one of the pair of end plates.

2. A power supply device comprising:
    a battery stack configured to have a plurality of battery cells stacked together;
    a pair of end plates disposed at both ends of the battery stack in a stacked direction of the battery stack; and
    a binding bar configured to have both ends of the binding bar coupled to the pair of end plates, wherein
    the binding bar includes: a plate-shaped bar that extends in the stacked direction of the battery stack; and an engagement block that is provided on the plate-shaped bar and protrudes toward an outer peripheral face of each of the pair of end plates,
    the plate-shaped bar and the engagement block are made of a same metal material and are integrally formed with each other,
    one of the pair of end plates includes: a fitting part to which the engagement block is guided, on the outer peripheral face of the one of the pair of end plates; a stopper that is disposed at a side of the battery stack with respect to the fitting part and abuts the engagement block; and a clearance at a corner between the fitting part and the stopper, and
    the engagement block is guided to the fitting part and is fixed to the outer peripheral face of each of the pair of end plates.

3. The power supply device according to claim 1, wherein the engagement block is fixed to the outer peripheral face of the one of the pair of end plates with a plurality of bolts.

4. The power supply device according to claim 3, wherein
the engagement block includes a guiding recess configured to prevent a head part of each of the plurality of bolts from protruding from a face of the engagement block, and
each of the plurality of bolts that has the head part guided to the guiding recess penetrates the engagement block to screw into a corresponding one of the pair of end plates.

5. The power supply device according to claim 1, wherein
the plate-shaped bar and the engagement block are made of any one of iron, an iron alloy, stainless steel (SUS), aluminum, and an aluminum alloy.

6. The power supply device according to claim 1, wherein the engagement block has a width in the stacked direction of the plurality of battery cells, the width of more than or equal to 10 mm.

7. The power supply device according to claim 1, wherein each of the pair of end plates is made of metal.

8. An electric vehicle equipped with the power supply device according to claim 1, the electric vehicle comprising:
a motor for driving, the motor to which the power supply device supplies power;
a vehicle body on which each of the power supply device and the motor is mounted; and
a wheel configured to be operated by the motor to drive the vehicle body.

9. A power storage device equipped with the power supply device according to claim 1, the power storage device comprising:
a power supply controller configured to control charging to and discharging from the power supply device, wherein the power supply controller allows battery cells to be charged by power from an externally connected device and controls charging to the battery cells.

10. The power supply device according to claim 2, wherein the engagement block is fixed to the outer peripheral face of the one of the pair of end plates with a plurality of bolts.

11. The power supply device according to claim 10, wherein
the engagement block includes a guiding recess configured to prevent a head part of each of the plurality of bolts from protruding from a face of the engagement block, and
each of the plurality of bolts that has the head part guided to the guiding recess penetrates the engagement block to screw into a corresponding one of the pair of end plates.

12. The power supply device according to claim 2, wherein
the plate-shaped bar and the engagement block are made of any one of iron, an iron alloy, stainless steel (SUS), aluminum, and an aluminum alloy.

13. The power supply device according to claim 2, wherein the engagement block has a width in the stacked direction of the plurality of battery cells, the width of more than or equal to 10 mm.

14. The power supply device according to claim 2, wherein each of the pair of end plates is made of metal.

15. An electric vehicle equipped with the power supply device according to claim 2, the electric vehicle further comprising:
a motor for driving, the motor to which the power supply device supplies power;
a vehicle body on which each of the power supply device and the motor is mounted; and
a wheel configured to be operated by the motor to drive the vehicle body.

16. A power storage device equipped with the power supply device according to claim 2, the power storage device further comprising:
a power supply controller configured to control charging to and discharging from the power supply device, wherein the power supply controller allows battery cells to be charged by power from an externally connected device and controls charging to the battery cells.

* * * * *